a12) United States Patent
Penta et al.

(10) Patent No.: US 8,745,736 B2
(45) Date of Patent: Jun. 3, 2014

(54) INTERNET PROTOCOL ADDRESS SPACE MANAGEMENT TO MITIGATE AND DETECT CLOAKING AND OTHER ABUSE

(75) Inventors: Anthony Penta, Bellevue, WA (US); Robert Sim, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 53 days.

(21) Appl. No.: 13/269,632

(22) Filed: Oct. 10, 2011

(65) Prior Publication Data

US 2013/0091566 A1 Apr. 11, 2013

(51) Int. Cl.
*G06F 11/00* (2006.01)

(52) U.S. Cl.
USPC .............................................. 726/22; 726/26

(58) Field of Classification Search
USPC ...................................................... 726/22–26
See application file for complete search history.

(56) References Cited

U.S. PATENT DOCUMENTS

| | | | |
|---|---|---|---|
| 6,910,077 B2 | 6/2005 | Najork | |
| 7,349,901 B2 | 3/2008 | Ramarathnam et al. | |
| 7,873,635 B2 | 1/2011 | Wang et al. | |
| 7,885,952 B2 | 2/2011 | Chellapilla et al. | |
| 7,890,135 B2 * | 2/2011 | Eckhart | 455/552.1 |
| 7,908,665 B2 | 3/2011 | Chase | |
| 8,069,483 B1 * | 11/2011 | Matlock | 726/23 |
| 2007/0022210 A1 | 1/2007 | Roy et al. | |
| 2010/0251383 A1 * | 9/2010 | Cosby | 726/26 |

OTHER PUBLICATIONS

Wu, et al., "Detecting Semantic Cloaking on the Web", Retrieved at <<http://citeseerx.ist.psu.edu/viewdoc/download?doi=10.1.1.72. 4440&rep=rep1&type=pdf>>, Proceedings of the 15th international conference on World Wide Web, May 23-26, 2006, pp. 10.
Chellapilla, et al., "Improving Cloaking Detection using Search QueryPopularity and Monetizability", Retrieved at <<http:// citeseerx.ist.psu.edu/viewdoc/download?doi=10.1.1.89.3965 &rep=rep1&type=pdf>>, Second International Workshop on Adversarial Information Retrieval on the Web at the 29th Annual International ACM SIGIR Conference, Aug. 10, 2006, pp. 7.

* cited by examiner

*Primary Examiner* — Samson Lemma
(74) *Attorney, Agent, or Firm* — Bryan Webster; Andrew Sanders; Mickey Minhas

(57) ABSTRACT

In one embodiment, an intelligent detection system 102 may determine if a network target 108 is an adversarial site based on comparing responses to different network sources. The intelligent detection system 102 may select a test apparent network source 110 and a control apparent network source 112 from a network source pool 106. The intelligent detection system 102 may receive the test response responding to a test request from the test apparent network source 110 to a network target 108. The intelligent detection system 102 may receive the control response responding to a control request from the control apparent network source 112 to the network target 108. The intelligent detection system 102 may execute a comparison of the test response to the control response.

20 Claims, 7 Drawing Sheets

*300*

INTERNET PROTOCOL ADDRESS SPACE MANAGEMENT TO MITIGATE AND DETECT CLOAKING AND OTHER ABUSE

BACKGROUND

An adversarial website, such as a malware attack site, may seek to cloak the presence of the malware from defensive software. The adversarial website may seek to identify protective reconnaissance and provide a less threatening content to this reconnaissance to prevent detection. A request from a compromised client may be provided with an innocent response, while a request from an unknown client may be provided with malware.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Embodiments discussed below relate to an intelligent detection system that determines if a network target is an adversarial site based on comparing responses to different network sources. The intelligent detection system may select a test apparent network source and a control apparent network source from a network source pool. The intelligent detection system may receive the test response responding to a test request from the test apparent network source to a network target. The intelligent detection system may receive the control response responding to a control request from the control apparent network source to the network target. The intelligent detection system may execute a comparison of the test response to the control response.

DRAWINGS

In order to describe the manner in which the above-recited and other advantages and features can be obtained, a more particular description is set forth and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

DETAILED DESCRIPTION

Embodiments are discussed in detail below. While specific implementations are discussed, it should be understood that this is done for illustration purposes only. A person skilled in the relevant art will recognize that other components and configurations may be used without parting from the spirit and scope of the subject matter of this disclosure. The implementations may be a machine-implemented method, a tangible machine-readable medium having a set of instructions detailing a method stored thereon for at least one processor, or an intelligent detection system.

Generally, content on the internet may be the same when viewed from different internet protocol (IP) addresses. While some content may be altered for purposes of language translation or copyright protection, a network site that changes content based on the requestor may often be doing so for nefarious purposes. These adversarial sites may serve alternate content to a defensive crawling service than what is presented to an end user, using internet protocol address differentiation and referring uniform resource locator detection.

To counteract this, an intelligent detection system may maintain a network source pool containing multiple apparent network sources. An apparent network source is the source of a request for content or data as seen by the network site receiving the request. These network sources may each have a unique internet protocol address, as well as varied network source information and even a dummy profile describing the habits of a user. The intelligent detection system may use these different network sources to query a network site, referred to here as a network target, to determine if that network target is giving different responses to different users. A response is any data or content received from a network target in response to a query from a network source, such as web content.

Thus, in one embodiment, an intelligent detection system may determine if a network target is an adversarial site based on comparing responses to different network sources. The intelligent detection system may select a test apparent network source and a control apparent network source from a network source pool. The intelligent detection system may receive the test response responding to a test request from the test apparent network source to a network target. The intelligent detection system may receive the control response responding to a control request from the control apparent network source to the network target. The intelligent detection system may execute a comparison of the test response to the control response.

Figure 1:
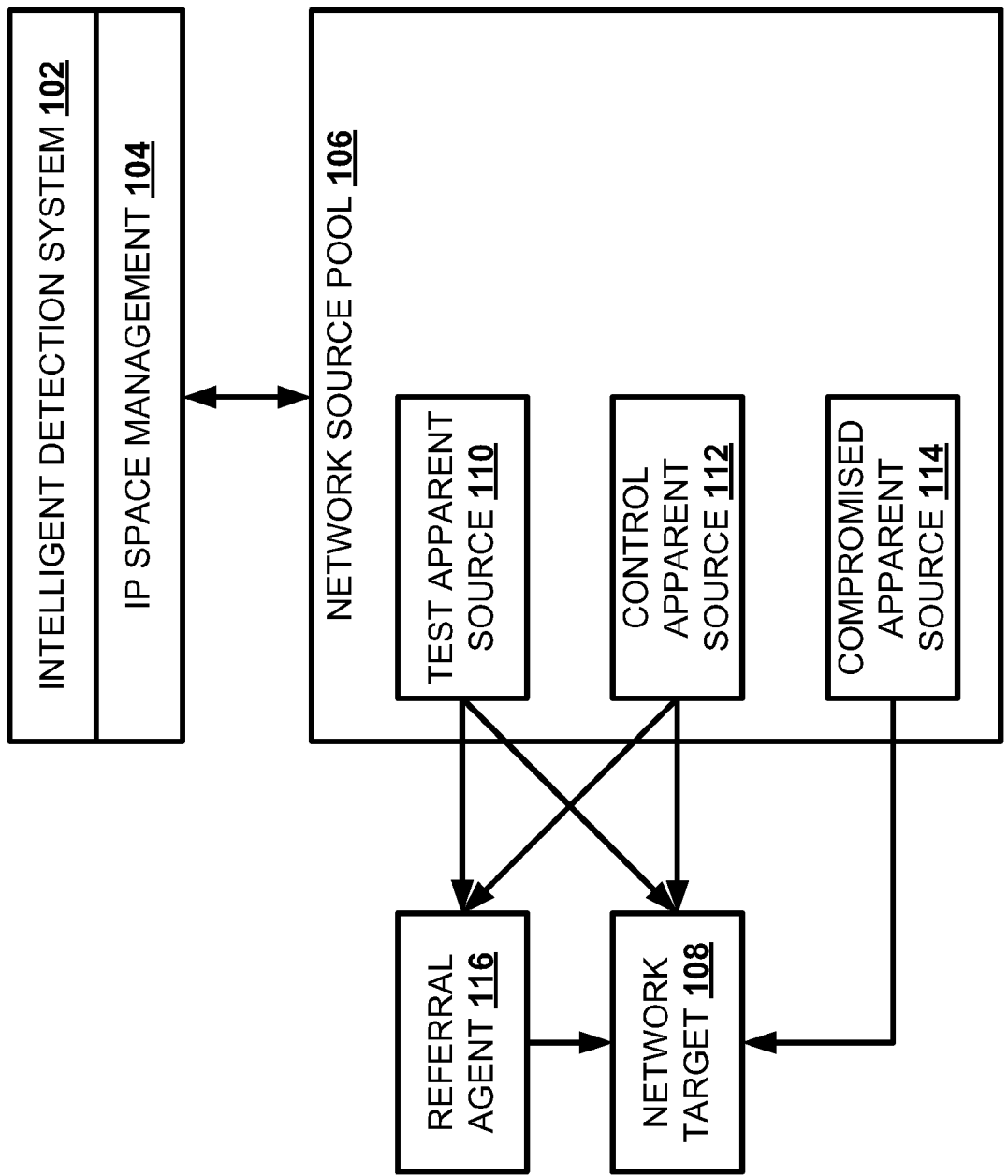
FIG. 1 illustrates, in a block diagram, one embodiment of a detection network.

FIG. 1 illustrates, in a block diagram, one embodiment of a detection network 100. An intelligent detection system 102 may use an internet protocol (IP) space management system 104 to manage a network source pool 106 containing a number of apparent network sources. The intelligent detection system 102 may use these apparent network sources to mask queries to a network target 108, so that the network target 108 thinks that the queries are coming from multiple sources. The intelligent detection system 102 may compare the responses to these queries to determine if the network target 108 gives different responses based on the apparent network source making the query. These different responses may seem harmless, but also may indicate an adversarial intent.

The intelligent detection system 102 may select a test apparent network source 110 and a control apparent network source 112 to each send a request to the network target 108 to receive a response. The request may be a web page access and the response may be the web page content. An apparent network source may be a test apparent network source 110 in one test and a control apparent network source 112 in a different test. The test apparent network source 110 may send a test request to the network target 108 in order to receive a test response. The control apparent network source 110 may send a control request to the network target 108 in order to receive a control response.

The intelligent detection system 102 may direct a compromised apparent network source 114 to send a request to the network target 108. A compromised apparent network source 114 is an apparent network source that has been identified as part of an adversarial action protection system. For example, the internet protocol address of the compromised apparent network source 114 may belong to a computer protection company, such as an antivirus software creator. A compromised response to a compromised request from a compromised apparent network source may be considered tainted. Comparing a test response to such a compromised response may yield valuable data as to whether the site is adversarial or whether the differences between the responses are due to benign issues.

Either the test apparent network source 110 or the control apparent network source 112 may further disguise the actual source of the test request by seeking the network target 108 through a referral agent 116. The referral agent 116 is any site that causes a network target 108 to receive a request indirectly. A referral agent 116 may be a proxy site that issues a request on behalf of the test apparent network source 110. Alternately, the referral agent 116 may be an advertising site that funnels requests to the network target 108.

Figure 2:
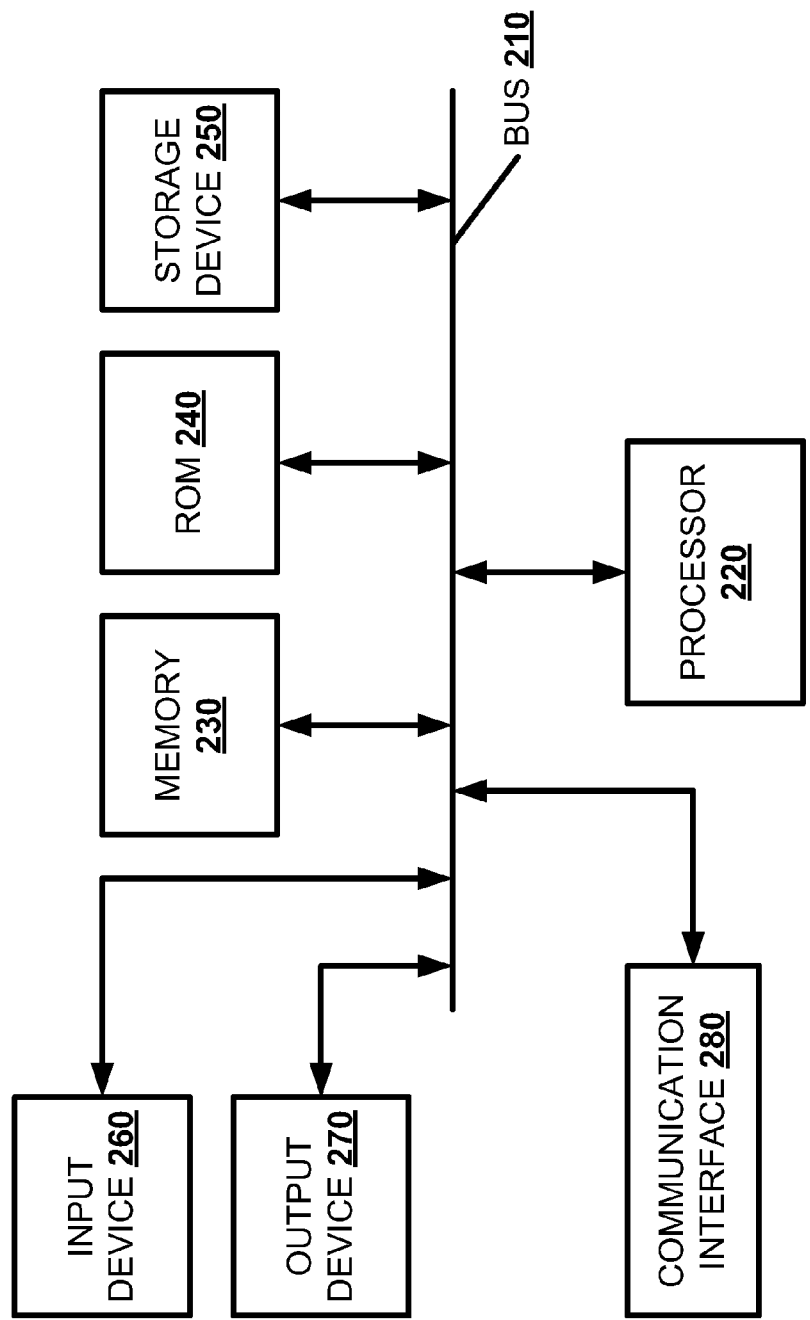
FIG. 2 illustrates, in a block diagram, one embodiment of a computing device.

FIG. 2 illustrates a block diagram of an exemplary computing device 200 which may act as an intelligent detection system 102. The computing device 200 may combine one or more of hardware, software, firmware, and system-on-a-chip technology to implement the intelligent detection system 102. The computing device 200 may include a bus 210, a processor 220, a memory 230, a read only memory (ROM) 240, a storage device 250, an input device 260, an output device 270, and a communication interface 280. The bus 210 may permit communication among the components of the computing device 200.

The processor 220 may include at least one conventional processor or microprocessor that interprets and executes a set of instructions. The memory 230 may be a random access memory (RAM) or another type of dynamic storage device that stores information and instructions for execution by the processor 220. The memory 230 may also store temporary variables or other intermediate information used during execution of instructions by the processor 220. The ROM 240 may include a conventional ROM device or another type of static storage device that stores static information and instructions for the processor 220. The storage device 250 may include any type of tangible machine-readable medium, such as, for example, magnetic or optical recording media and its corresponding drive. The storage device 250 may store a set of instructions detailing a method that when executed by one or more processors cause the one or more processors to perform the method. The storage device 250 may also be a database or a database interface for storing a network source pool 106.

The input device 260 may include one or more conventional mechanisms that permit a user to input information to the computing device 200, such as a keyboard, a mouse, a voice recognition device, a microphone, a headset, etc. The output device 270 may include one or more conventional mechanisms that output information to the user, including a display, a printer, one or more speakers, a headset, or a medium, such as a memory, or a magnetic or optical disk and a corresponding disk drive. The communication interface 280 may include any transceiver-like mechanism that enables computing device 200 to communicate with other devices or networks. The communication interface 280 may include a network interface or a mobile transceiver interface. The communication interface 280 may be a wireless, wired, or optical interface.

The computing device 200 may perform such functions in response to processor 220 executing sequences of instructions contained in a computer-readable medium, such as, for example, the memory 230, a magnetic disk, or an optical disk. Such instructions may be read into the memory 230 from another computer-readable medium, such as the storage device 250, or from a separate device via the communication interface 280.

Figure 3:
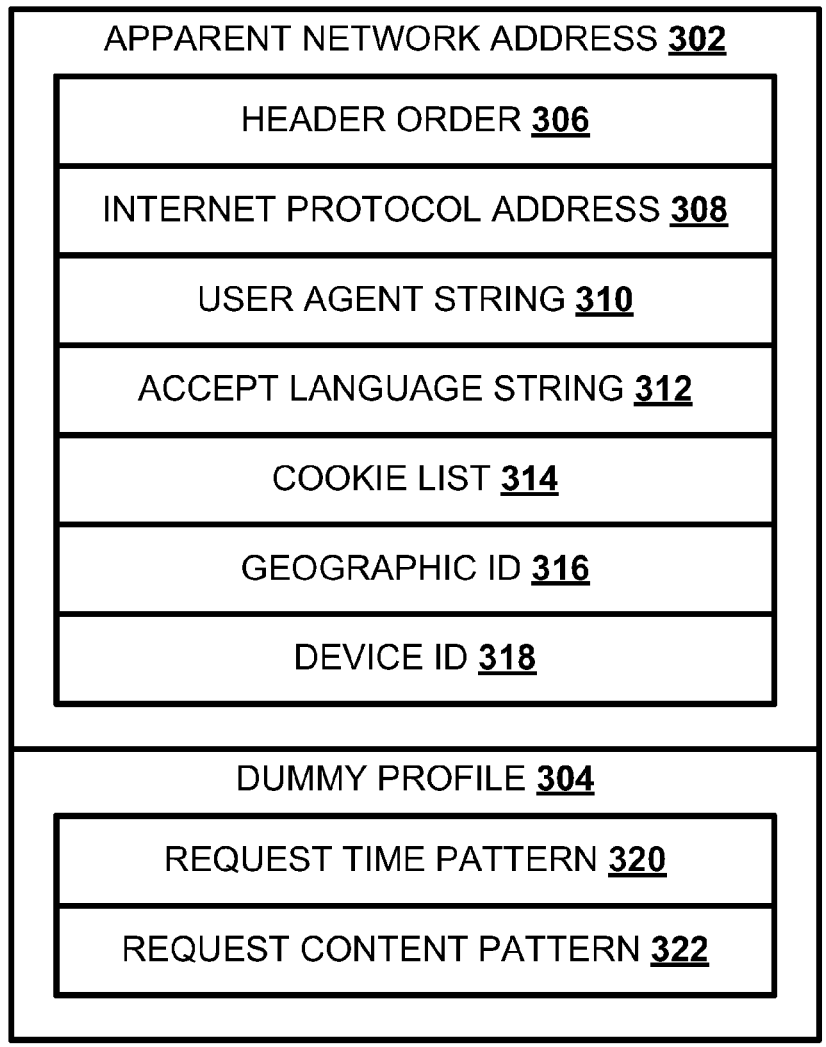
FIG. 3 illustrates, in a block diagram, one embodiment of a network source file.

FIG. 3 illustrates, in a block diagram, one embodiment of a network source file 300 describing an apparent network source. A network source file 300 may have an apparent network address 302 describing the route and transfer details of the request. A network source file 300 may have a dummy profile 304, describing the browsing habits of the fake user that is making the request.

The apparent network address 302 may have a header order field 306, an internet protocol address field 308, a user agent string field 310, an accept language string field 312, a cookie list field 314, a geographic identifier field 316, and a device identifier field 318. The header order field 306 describes the order that data appears in the header of the request. The internet protocol address field 308 describes the originating internet protocol address for the request. The user agent string field 310 identifies the browser type that the apparent network source is using to make a request. The accept language string field 312 identifies the requested language for the response. The cookie list field 314 describes any cookies present in the browser of the apparent network source. The geographic identifier field 316 describes the location of the apparent network source. The device identifier field 318 describes the machine making the request.

The dummy profile 304 may have a request time pattern field 320 and a request content pattern field 322. The request time pattern field 320 describes the frequency and time that the apparent network source may make a request. The request time pattern field 320 may be random enough not to seem mechanical, but not so random as to call attention to the randomness. The request content pattern field 322 may describe the content of previous sites visited by the apparent network source. Again, the request content pattern may be random enough not to seem mechanical, but not so random as to call attention to the randomness.

Figure 4:
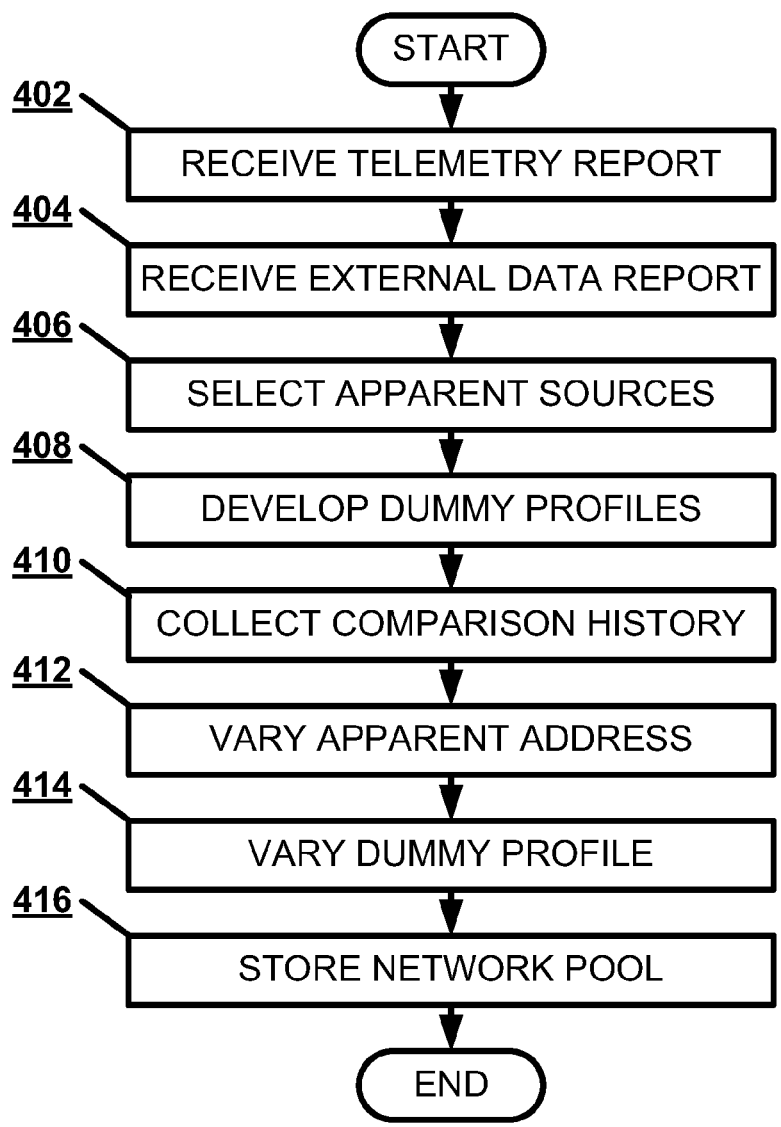
FIG. 4 illustrates, in a flowchart, one embodiment of a method of creating a network source pool.

The intelligent detection system 102 may administer a varied network source pool 106. FIG. 4 illustrates, in a flowchart, one embodiment of a method 400 of creating a network source pool 106. The intelligent detection system 102 may receive an internal request telemetry report (Block 402). The internal request telemetry report describes the history of requests and responses by apparent network sources administered by the intelligent detection system 102. The intelligent detection system 102 may receive an external data report (Block 404). The external data report is a description of a network target 108 from a source outside the intelligent detection system 102. The intelligent detection system 102 may select apparent network sources for the network source pool 106, including the test apparent network source 110 and the control apparent network source 112, based on at least one of the internal request telemetry report and the external data report (Block 406). The intelligent detection system 102 may develop a dummy profile for each apparent network source (Block 408). For example, the intelligent detection system 102 may develop a test dummy profile associated with the test apparent network source 110. The intelligent detection system 102 may develop a control dummy profile associated with the control apparent network source 112.

The intelligent detection system 102 may collect a comparison history for comparisons made between apparent network sources in the network source pool 106 (Block 410). The intelligent detection system 102 may vary the apparent network addresses between the apparent network sources of the network source pool 106 (Block 412). For example, the intelligent detection system 102 may vary at least one of an internet protocol address, a header order, a user agent string, an accept-language string, a cookie, a geographic identifier, and a device identifier between the apparent network sources, such as the test apparent network source and the control apparent network source. The intelligent detection system 102 may vary the dummy profiles between the apparent network sources of the network source pool 106 (Block 414). For example, the intelligent detection system 102 may vary at least one of a request time pattern and a request content pattern between apparent network sources, such as the test dummy profile and the control dummy profile. The intelligent detection system 102 may store the network source pool 106 in a data storage or a database (Block 416).

Figure 5:
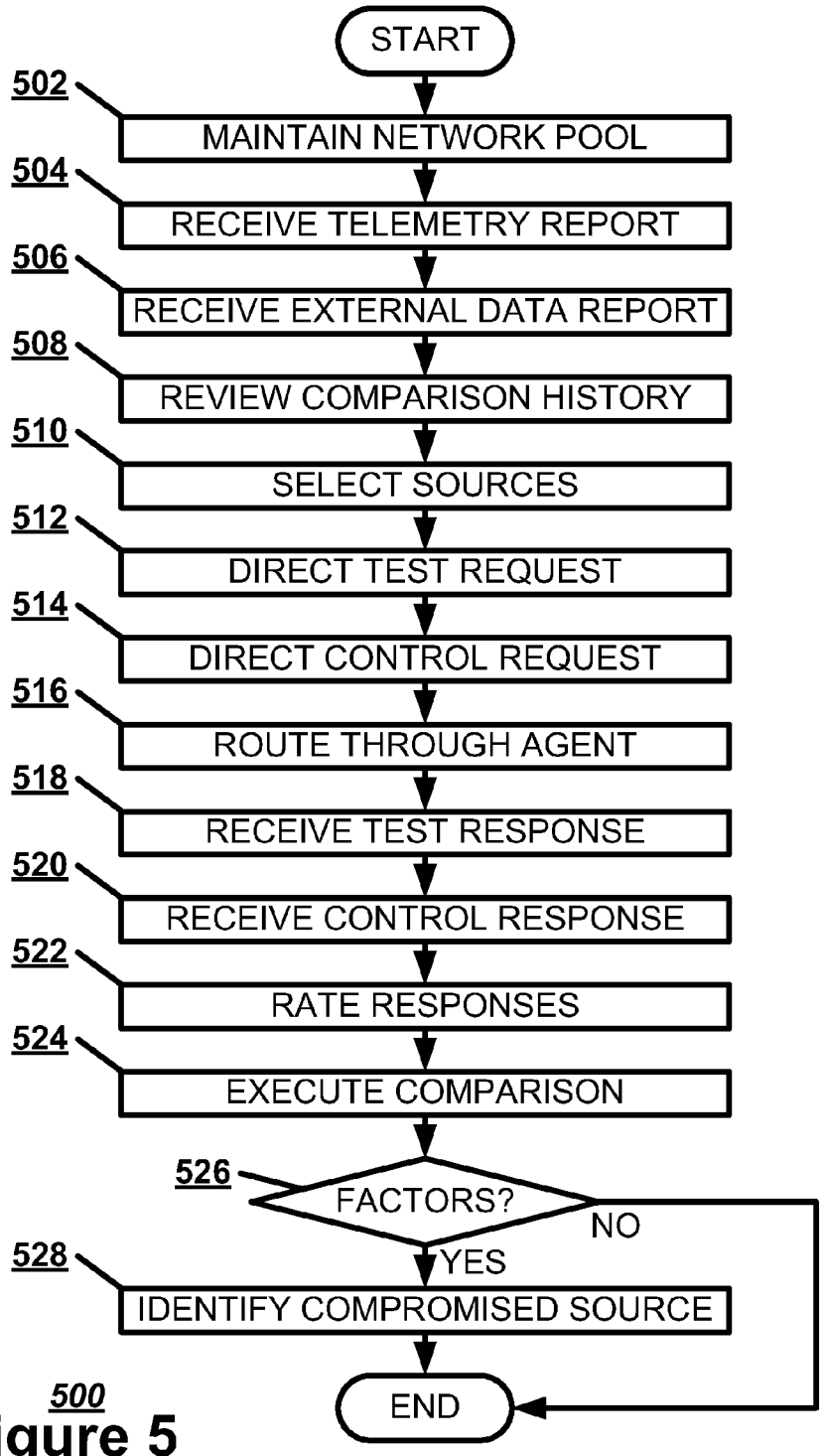
FIG. 5 illustrates, in a flowchart, one embodiment of a method of identifying a compromised apparent network source.

The intelligent detection system 102 may directly gather a set of responses to determine if an apparent network source has been compromised. FIG. 5 illustrates, in a flowchart, one embodiment of a method 500 of identifying a compromised apparent network source 114. The intelligent detection system 102 may maintain a network source pool 106 (Block 502). The intelligent detection system 102 may receive an internal request telemetry report (Block 504). The intelligent detection system 102 may receive an external data report (Block 506). The intelligent detection system 102 may review a comparison history for comparisons made between apparent network sources in the network source pool 106 (Block 508). The intelligent detection system 102 may select a test apparent network source 110 and a control apparent network source 112 from a network source pool 106 based on the comparison history (Block 510).

The intelligent detection system 102 may direct the test apparent network source 110 to send a test request to a network target 108 (Block 512). The intelligent detection system 102 may direct the control apparent network source 112 to send a control request to the network target 108 (Block 514). The intelligent detection system 102 may direct at least one of the test content request or the control content request to be routed through a referral agent 116 (Block 516).

The intelligent detection system 102 may receive a test response responding to the test request from the test apparent network source 110 to the network target 108 (Block 518). The intelligent detection system 102 may receive a control response responding to the control request from the control apparent network source 112 to the network target 108 (Block 520). The intelligent detection system 102 may rate the test response and the control response (Block 522). The intelligent detection system 102 may execute a comparison of the test response to the control response (Block 524). If the factors so indicate (Block 526), the intelligent detection system 102 may identify a compromised apparent network source based on the comparison (Block 528). The intelligent detection system 102 may take a wide range of factors into account when executing the comparison.

Figure 6:
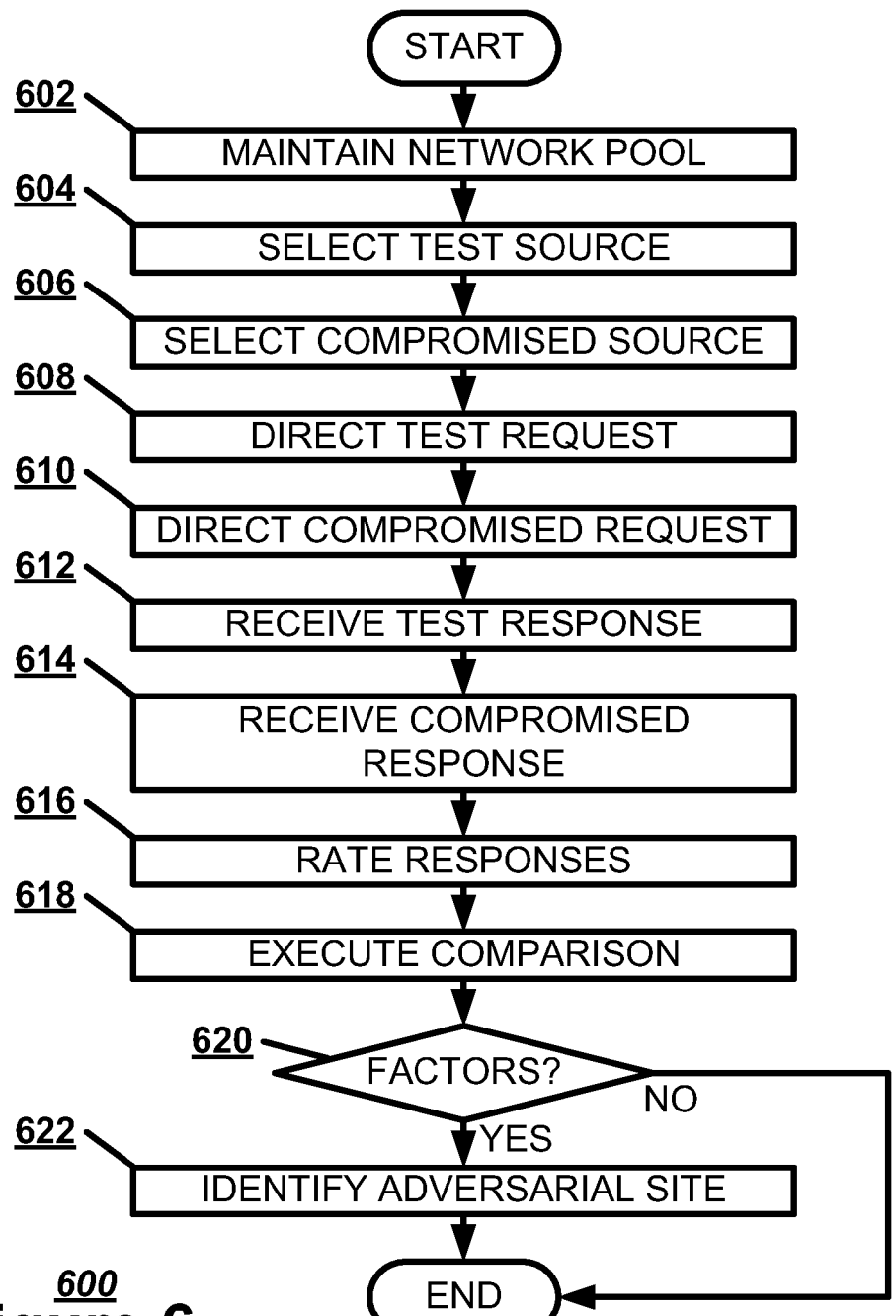
FIG. 6 illustrates, in a flowchart, one embodiment of a method of identifying an adversarial network site.

The intelligent detection system 102 may directly gather a set of responses to determine if a network target 108 is an adversarial network site. FIG. 6 illustrates, in a flowchart, one embodiment of a method 600 of identifying an adversarial network site. The intelligent detection system 102 may maintain a network source pool 106 (Block 602). The intelligent detection system 102 may select a test apparent network source 110 from a network source pool 106 based on a comparison history (Block 604). The intelligent detection system 102 may select a compromised apparent network source 114 from a network source pool 106 (Block 606).

The intelligent detection system 102 may direct the test apparent network source 110 to send a test request to a network target 108 (Block 608). The intelligent detection system 102 may direct the compromised apparent network source 114 to send a compromised request to the network target 108 (Block 610). The intelligent detection system 102 may receive a test response responding to the test request from the test apparent network source 110 to the network target 108 (Block 612). The intelligent detection system 102 may receive a compromised response responding to the compromised request from the compromised apparent network source 114 to the network target 108 (Block 614). The intelligent detection system 102 may rate the test response and the compromised response (Block 616). The intelligent detection system 102 may execute a comparison of the test response to the compromised response (Block 618). If the factors so indicate (Block 620), the intelligent detection system 102 may identify the network target 108 as an adversarial network site based on the comparison (Block 622). The intelligent detection system 102 may take a wide range of factors into account when executing the comparison.

Figure 7:
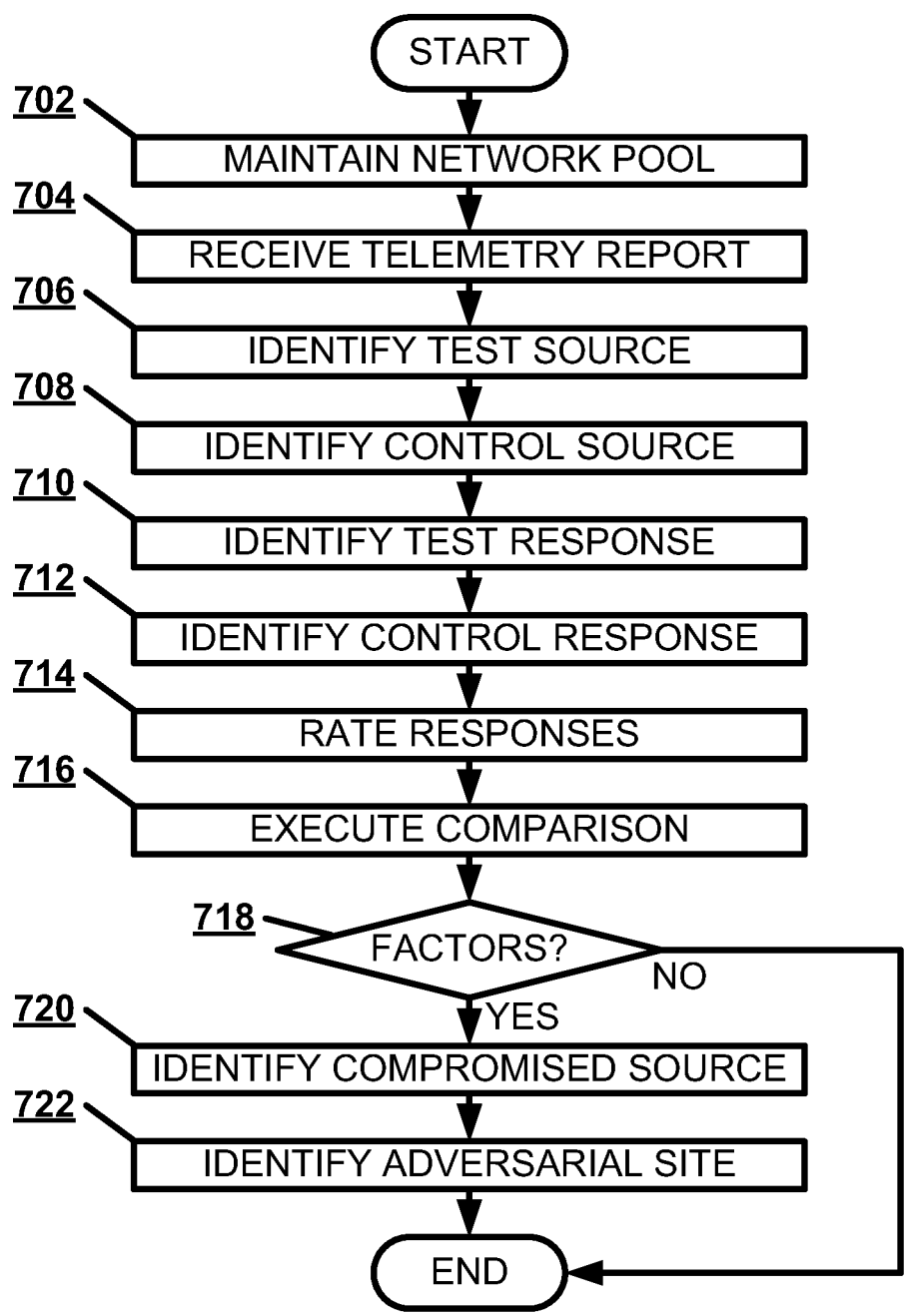
FIG. 7 illustrates, in a flowchart, one embodiment of a method of identifying a compromised apparent network source or an adversarial network site using a telemetry report.

The intelligent detection system 102 may passively gather a set of responses to determine if an apparent network source has been compromised or if a network target 108 is an adversarial network site. FIG. 7 illustrates, in a flowchart, one embodiment of a method 700 of identifying a compromised apparent network source 114. The intelligent detection system 102 may maintain a network source pool 106 (Block 702). The intelligent detection system 102 may receive an internal request telemetry report for the network source pool 106 (Block 704). The intelligent detection system 102 may identify a test apparent network source 110 in the internal request telemetry report (Block 706). The intelligent detection system 102 may identify a control apparent network source 112 in the internal request telemetry report (Block 708). The intelligent detection system 102 may identify a test response responding to the test request from the test apparent network source 110 to the network target 108 (Block 710). The intelligent detection system 102 may identify a control response responding to the control request from the control apparent network source 112 to the network target 108 (Block 712). The intelligent detection system 102 may rate the test response and the control response (Block 714). The intelligent detection system 102 may execute a comparison of the test response to the control response (Block 716). If the factors so indicate (Block 718), the intelligent detection system 102 may identify a compromised apparent network source based on the comparison (Block 720). The intelligent detection system 102 may identify the network target 108 as an adversarial network site based on the comparison (Block 722). The intelligent detection system 102 may take a wide range of factors into account when executing the comparison.

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Embodiments within the scope of the present invention may also include non-transitory computer-readable storage media for carrying or having computer-executable instructions or data structures stored thereon. Such non-transitory computer-readable storage media may be any available media that can be accessed by a general purpose or special purpose computer. By way of example, and not limitation, such non-transitory computer-readable storage media can comprise RAM, ROM, EEPROM, CD-ROM or other optical disk storage, magnetic disk storage or other magnetic storage devices, or any other medium which can be used to carry or store desired program code means in the form of computer-executable instructions or data structures. Combinations of the above should also be included within the scope of the non-transitory computer-readable storage media.

Embodiments may also be practiced in distributed computing environments where tasks are performed by local and remote processing devices that are linked (either by hardwired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments are part of the scope of the disclosure. For example, the principles of the disclosure may be applied to each individual user where each user may individually deploy such a system. This enables each user to utilize the benefits of the disclosure even if any one of a large number of possible applications do not use the functionality described herein. Multiple instances of electronic devices each may process the content in various possible ways. Implementations are not necessarily in one system used by all end users. Accordingly, the appended claims and their legal equivalents should only define the invention, rather than any specific examples given.

We claim:

1. A machine-implemented method, comprising:
   selecting a test apparent network source associated with a test dummy profile describing a test user browsing habit and a control apparent network source associated with a control dummy profile describing a control user browsing habit from a network source pool;
   receiving the test response responding to a test request from the test apparent network source to a network target;
   receiving the control response responding to a control request from the control apparent network source to the network target; and
   executing a comparison of the test response to the control response.

2. The method of claim 1, further comprising:
   selecting the test apparent network source and the control apparent network source based on at least one of an internal request telemetry report and an external data report.

3. The method of claim 1, further comprising:
   varying at least one of an internet protocol address, a header order, a user agent string, an accept-language string, a cookie, a geographic identifier, and a device identifier between the test apparent network source and the control apparent network source.

4. The method of claim 1, further comprising:
   varying at least one of a request time pattern and a request content pattern between the test dummy profile and the control dummy profile.

5. The method of claim 1, further comprising:
   collecting a comparison history.

6. The method of claim 5, further comprising:
   selecting the test apparent network source and the control apparent network source based on the comparison history.

7. The method of claim 1, further comprising:
   receiving a compromised response responding to a compromised request from a compromised apparent network source to the network target.

8. The method of claim 1, further comprising:
   directing at least one of the test content request and the control content request to be routed through a referral agent.

9. The method of claim 1, further comprising:
   rating the test response and the control response.

10. The method of claim 1, further comprising:
    identifying a compromised apparent network source based on the comparison.

11. The method of claim 1, further comprising:
    identifying the network target as a malicious network site based on the comparison.

12. A tangible machine-readable storage device having a set of instructions detailing a method stored thereon that when executed by one or more processors cause the one or more processors to perform the method, the method comprising:
    directing a test apparent network source associated with a test dummy profile describing a test user browsing habit to send a test request to a network target;
    receiving a test response responding to the test request;
    directing a control apparent network source associated with a control dummy profile describing a control user browsing habit to send a control request to the network target;
    receiving a control response responding to the control request; and
    executing a comparison of the test response to the control response.

13. The tangible machine-readable storage device of claim 12, wherein the method further comprises:
    collecting a comparison history.

14. The tangible machine-readable storage device of claim 13, wherein the method further comprises:
    selecting the test apparent network source and the control apparent network source based on the comparison history.

15. The tangible machine-readable storage device of claim 13, wherein the method further comprises:
    varying the test dummy profile associated with the test apparent network source and the control dummy profile associated with the control apparent network source based on the comparison history.

16. The tangible machine-readable storage device of claim 12, wherein the method further comprises:
    identifying a compromised apparent network source based on the comparison.

17. The tangible machine-readable storage device of claim 12, wherein the method further comprises:
selecting the test apparent network source and the control apparent network source from a network source pool.

18. An intelligent detection system, comprising:
a data storage that stores a network source pool identifying a test apparent network source associated with a test dummy profile describing a test user browsing habit and a control apparent network source associated with a control dummy profile describing a control user browsing habit;
a communication interface that directs the test apparent network source to send a test content request to a network target, receives a test response from the test apparent network source, directs the control apparent network source to send a control content request to the network target, and receives a control response from the control apparent network source; and
a processor that executes a comparison of the test response to the control response to identify a compromised apparent network source.

19. The intelligent detection system of claim 17, wherein the processor rates the test response and the control response.

20. The intelligent detection system of claim 17, wherein the communication interface directs at least one of the test content request and the control content request to be routed through a referral agent.

* * * * *